(12) United States Patent
Tsuo et al.

(10) Patent No.: US 7,837,159 B2
(45) Date of Patent: Nov. 23, 2010

(54) POSITIONING MECHANISM AND DISPLAY DEVICE USING THE SAME

(75) Inventors: Chun-Jung Tsuo, Taoyuan County (TW); Chien-Hung Chen, Taipei County (TW); Cheng-Ping Hsieh, Taipei County (TW)

(73) Assignee: Qiada Corporation, Taoyuan County (TW)

( * ) Notice: Subject to any disclaimer, the term of this patent is extended or adjusted under 35 U.S.C. 154(b) by 709 days.

(21) Appl. No.: 11/802,348

(22) Filed: May 22, 2007

(65) Prior Publication Data

US 2007/0275571 A1 Nov. 29, 2007

(30) Foreign Application Priority Data

May 29, 2006 (TW) .................................. 95119049

(51) Int. Cl.
*A47F 5/02* (2006.01)
(52) U.S. Cl. ........................ 248/131; 248/144; 248/917; 248/919; 361/679.02; 361/679.07; 361/679.21; 361/679.22
(58) Field of Classification Search ................ 248/131, 248/144, 917, 919; 361/679.02, 679.07, 361/679.21, 679.22
See application file for complete search history.

(56) References Cited

U.S. PATENT DOCUMENTS

| | | | | |
|---|---|---|---|---|
| 5,168,423 A * | 12/1992 | Ohgami et al. | ......... | 361/679.07 |
| 5,687,944 A * | 11/1997 | Shon | ........................ | 249/349.1 |
| 5,941,493 A * | 8/1999 | Cheng | ........................ | 248/371 |
| 6,912,122 B2 * | 6/2005 | Chen et al. | .............. | 361/679.27 |
| 7,000,878 B2 * | 2/2006 | Lin | ........................ | 248/276.1 |
| 7,123,472 B2 * | 10/2006 | Huang et al. | ........... | 361/679.09 |
| 7,130,186 B2 * | 10/2006 | Yu | ........................ | 361/679.27 |
| 7,133,280 B2 * | 11/2006 | Love | ..................... | 361/679.07 |
| 7,375,956 B2 * | 5/2008 | Chuang et al. | ......... | 361/679.55 |
| 7,628,375 B2 * | 12/2009 | Jung et al. | ................... | 248/676 |
| 2006/0016942 A1 * | 1/2006 | Lo | ............................. | 248/131 |
| 2006/0203436 A1 * | 9/2006 | Hwang et al. | ............... | 367/679 |

\* cited by examiner

*Primary Examiner*—Terrell Mckinnon
*Assistant Examiner*—Michael McDuffie

(57) ABSTRACT

A positioning mechanism and a display device using the same are provided. The positioning mechanism comprises a fixed frame, a first buckling element, a second buckling element and a rotary component. The first buckling element is fixed to a first position of the fixed frame. The second buckling element is fixed to a second position of the fixed frame. The rotary component having a positioning pin is connected to an object and is pivoted to the fixed frame, such that the object and the rotary component are synchronously rotated with respect to the fixed frame. The object is in a first positioning state and a second positioning state when the positioning pin is buckled to the first buckling element and the second buckling element respectively.

31 Claims, 5 Drawing Sheets

POSITIONING MECHANISM AND DISPLAY DEVICE USING THE SAME

This application claims the benefit of Taiwan application Serial No. 95119049, filed May 29, 2006, the subject matter of which is incorporated herein by reference.

BACKGROUND OF THE INVENTION

1. Field of the Invention

The invention relates in general to a positioning mechanism and a display device using the same, and more particularly to a positioning mechanism that achieves the function of positioning by engaging a buckling element to a positioning pin and a display device using the same.

2. Description of the Related Art

Recent years, consumers request for a higher standard of visual presentation of display devices. Compared with the conventional aspect ratio of 4:3, the wide-screen aspect ratio of 16:9 or 16:10 provides extended and better visualization. This makes the display device with wide-screen aspect ratio become more and more popular. In accordance with the requirement of users, the display devices with wide-screen aspect ratio are designed to be capable of switching between a horizontal displaying state and a vertical displaying state, and a pivotal positioning mechanism is required for rotating and positioning the display monitor.

Referring to FIG. 1, a side view of a pivotal positioning mechanism of a conventional display device is shown. The pivotal positioning mechanism 10 comprises a fixed frame 11, a rotary component 12, a first pad w1, a second pad w2 and a rotary shaft 13. The fixed frame 11 is used for connecting the supporting base (not illustrated in the diagram) of the display device. The rotary component 12 is used for connecting the display monitor 15 of the display device. The first pad w1 is connected to the fixed frame 11 and has a number of positioning protrusions 14a. The second pad w2 is connected to the rotary component 12. The second pad w2 further has a number of positioning cavities 14b corresponding to these positioning protrusions 14a of the first pad w1. The rotary component 12 is pivotally connected to the fixed frame 11 via the rotary shaft 13. The rotary component 12 is rotated around the rotary shaft 13 with respect to the fixed frame 11. The conventional positioning mechanism 10 positions the display device by enabling positioning cavities 14b to be engaged to the positioning protrusions 14a.

However, due to the tight engagement of the first pad w1 and the second pad w2, when the first pad w1 and the second pad w2 are rotated relatively, the positioning protrusions 14a and the second pad w2 are apt to be worn out due to friction, and incapacitating the positioning protrusion 14a to be engaged to the positioning cavities 14b. Therefore, the display monitor 15 is mal-positioned by the pivotal positioning mechanism 10, and the display monitor 15 cannot be positioned accurately. To the worse, when the pivotal positioning mechanism 10 rotates, the display monitor 15 may tilt or end up with a skewed angle, and affects the appearance of the display device. After a long duration of service, the conventional pivotal positioning mechanism 10 is apt to inaccurate positioning, hence reducing the accuracy of positioning. Consequently, the practicality of the display device is reduced.

SUMMARY OF THE INVENTION

The invention is directed to a positioning mechanism and a display device using the same. As the display device is positioned by buckling a buckling element to a positioning pin, the mal-positioning of rotation due to the wearing between pads is avoided. Therefore, the arrangement and practicality of the display device are further improved.

According to a first aspect of the present invention, a positioning mechanism comprising a fixed frame, a first buckling element, a second buckling element and a rotary component is provided. The first buckling element is fixed to a first position of the fixed frame. The second buckling element is fixed to a second position of the fixed frame. The rotary component has a positioning pin and is connected to an object and is pivoted to the fixed frame, such that the object and the rotary component are synchronously rotated with respect to the fixed frame. The object is in a first positioning state and a second positioning state when the positioning pin is buckled to the first buckling element and the second buckling element respectively.

According to a second aspect of the present invention, a display device comprising a display monitor and a positioning mechanism is provided. The positioning mechanism comprises a fixed frame, a first buckling element, a second buckling element and a rotary component. The first buckling element is fixed to a first position of the fixed frame. The second buckling element is fixed to a second position of the fixed frame. The rotary component has a positioning pin and is connected to display monitor and is pivoted to the fixed frame, such that display monitor and the rotary component are synchronously rotated with respect to the fixed frame. The display monitor is in a first positioning state and a second positioning state when the positioning pin is buckled to the first buckling element and the second buckling element respectively.

The invention will become apparent from the following detailed description of the preferred but non-limiting embodiments. The following description is made with reference to the accompanying drawings.

DETAILED DESCRIPTION OF THE INVENTION

First Embodiment

Figure 1:
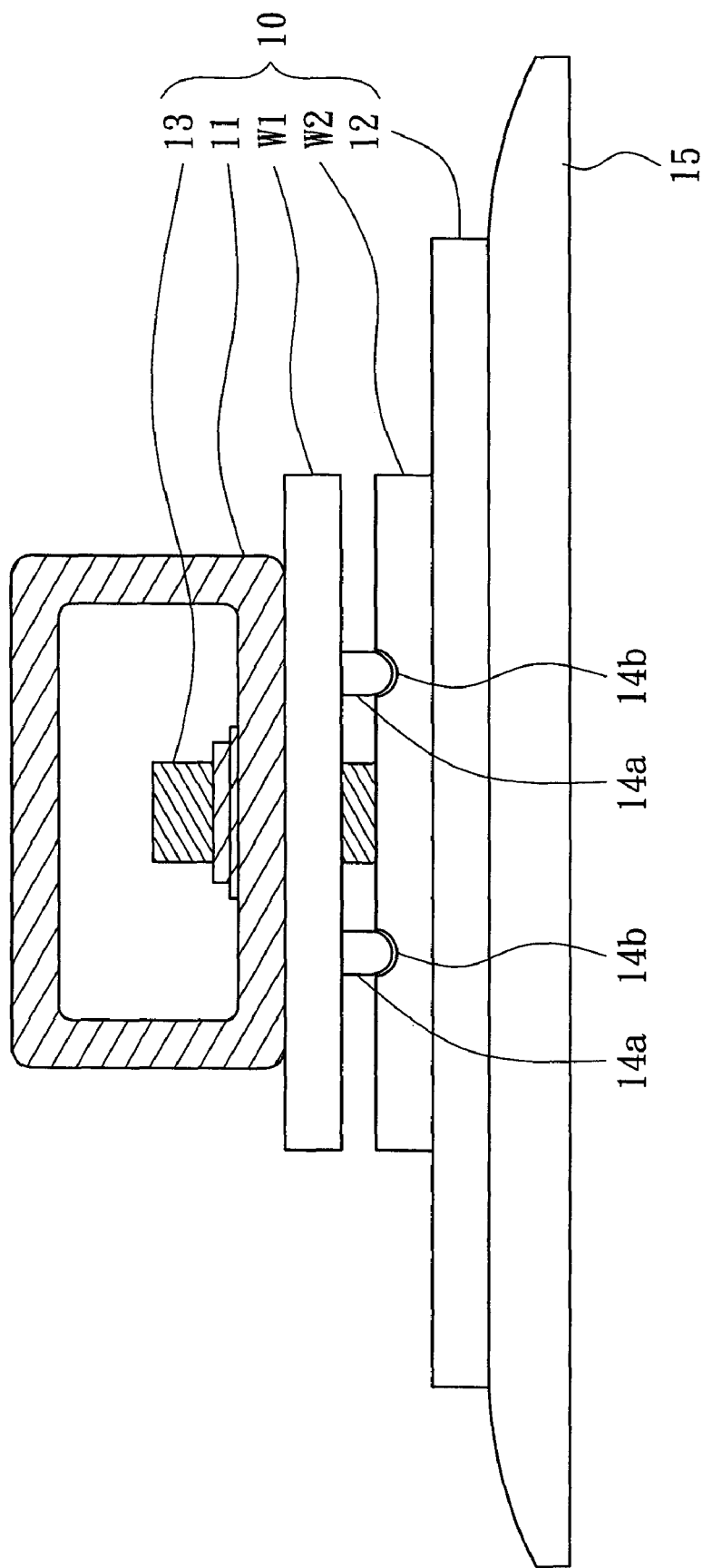
FIG. 1 is a side view of a pivotal positioning mechanism of a conventional display device.
Figure 2A:
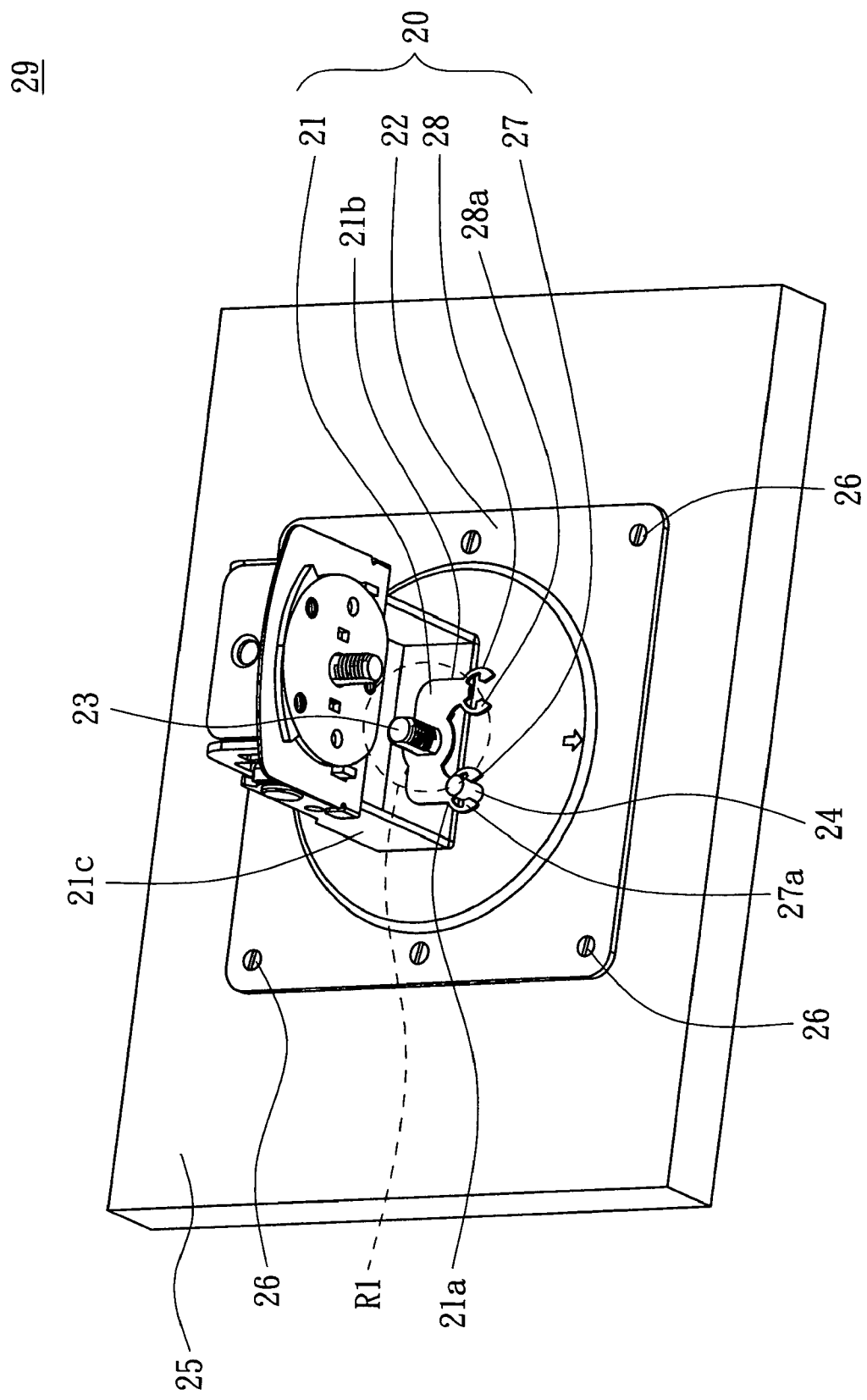
FIG. 2A is a perspective showing the positioning mechanism according to a first embodiment of the invention is in a first positioning state.
Figure 2B:
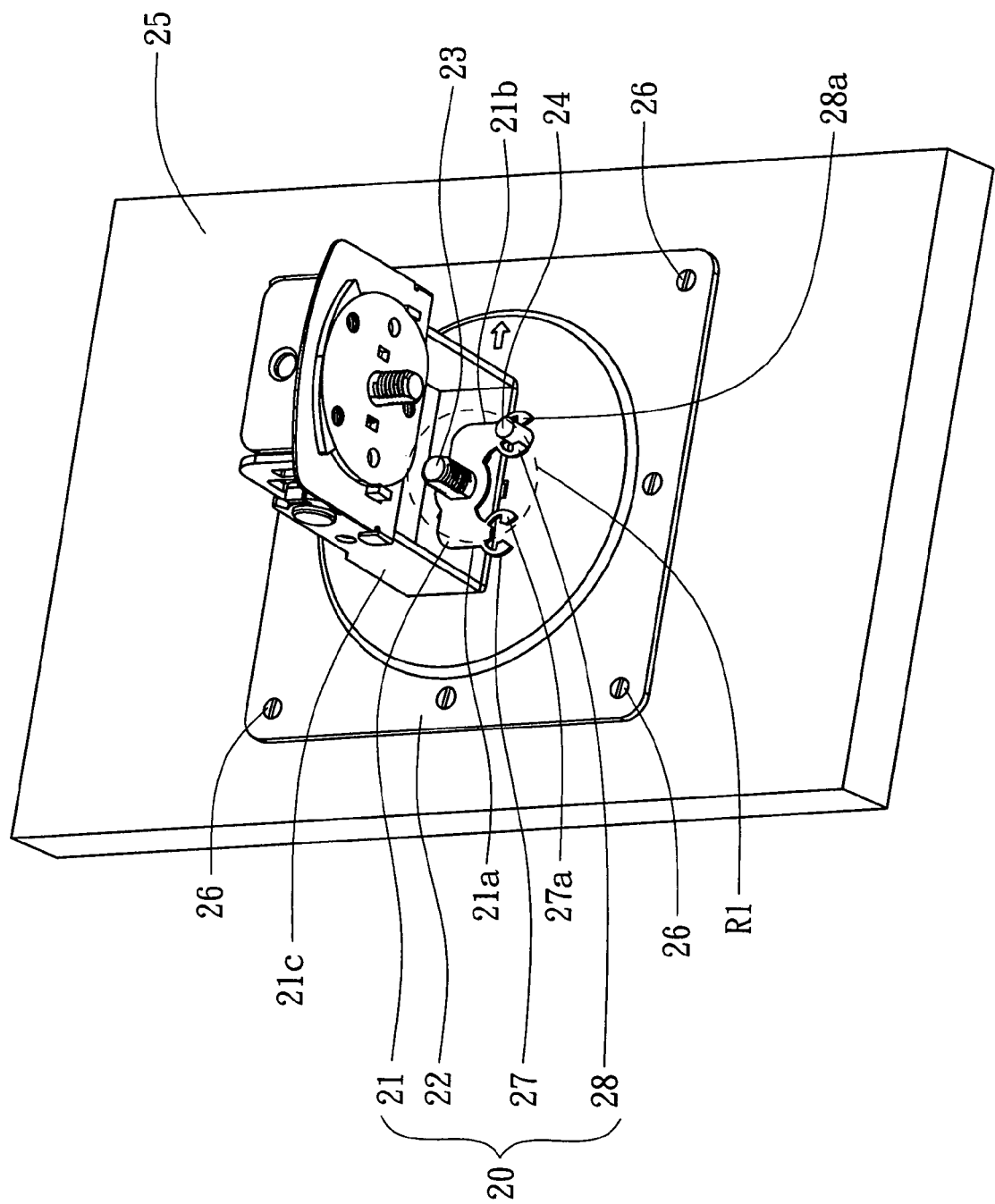
FIG. 2B is a perspective showing the positioning mechanism according to a first embodiment of the invention is in a second positioning state.

Referring to FIG. 2A~2B. FIG. 2A is a perspective showing the positioning mechanism according to a first embodiment of the invention is in a first positioning state. FIG. 2B is a perspective showing the positioning mechanism according to a first embodiment of the invention is in a second positioning state. As indicated in FIG. 2A~2B, the positioning mechanism 20 comprises a fixed frame 21, a first buckling element 27, a second buckling element 28 and a rotary component 22. The first buckling element 27 is fixed to a first position 21a of the fixed frame 21. The second buckling element 28 is fixed to a second position 21b of the fixed frame 21. In the present embodiment of the invention, the first buckling element 27 is connected to one end of the fixed frame 21, and the second buckling element 28 is connected to the other end of the fixed frame 21. The rotary component 22 is connected to an object 25 and is pivoted to the fixed frame 21, such that the object 25 and the rotary component 22 are synchronously rotated with respect to the fixed frame 21. The rotary component 22 has a positioning pin 24. The object 25 is in a first positioning state and a second positioning state when the positioning pin 24 is buckled to the first buckling element 27 and the second buckling element 28 respectively. The first positioning state and a second positioning state are respectively a horizontal displaying state and a vertical displaying state. When the object 25 is a display monitor, the positioning mechanism 20 and the object 25 form a display device 29.

In the present embodiment of the invention, the rotary component 22 is connected to the object 25 via a number of screws 26, and is further pivoted to the fixed frame 21 via the rotary shaft 23s, such that the object 25 and the rotary component 22 are synchronously rotated with respect to the fixed frame 21 around the rotary shaft 23. The first buckling element 27 has a pair of $1^{st}$ suspending arms and two opposite first flanges 27a. The second buckling element 28 has a pair of $2^{nd}$ suspending arms and two opposite second flanges 28a. When the first buckling element 27 clamps and fixes the positioning pin 24 through the elasticity of the $1^{st}$ suspending arms, the object 25 is clamped by the first flanges 27a at a first positioning state. When the second buckling element 28 clamps and fixes the positioning pin 24 through the elasticity of the $2^{nd}$ suspending arms, the object 25 is clamped by the second flanges 28a at a second positioning state.

Referring to FIG. 2A~2B. The force required for rotating the object 25 changes as the material elasticity of the first buckling element 27 and the second buckling element 28 changs. When the material elasticity of the first buckling element 27 and the second buckling element 28 increases, the force of clamping the positioning pin 24 increase accordingly, such that more force is required for rotating the object 25. The first buckling element 27, the second buckling element 28 and the fixed frame 21 are preferably formed in one piece. Besides, when the object 25 rotates, the first buckling element 27, the second buckling element 28 and the positioning pin 24 are located on a circular locus R1 that is centered around the rotary shaft 23. The fixed frame 21 is further connected to a linking element 21c that is synchronously rotated with the fixed frame 21. The linking element 21c is connected to a supporting base (not illustrated in the diagram) for supporting the object 25 on a plane.

In the first embodiment, the object 25 is exemplified by a display monitor. Further, other than screwing with several screws 26, the rotary component 22 can also be buckled, engaged or adhered to the object 25. Besides, the first buckling element 27 and the second buckling element 28 are an E-type rings or C-type rings for example. The clamping openings of the first buckling element 27 and the second buckling element 28 are slightly face-to-face. Furthermore, the force for clamping the positioning pin 24 by the first buckling element 27 or the second buckling element 28 changes as the material elasticity of the first buckling element 27 or the second buckling element 28 changes, such that the force required for rotating the object 25 also changes accordingly. Besides, the positioning mechanism 20 of the invention is applied in a display device. The display monitor of the display device can be exemplified by a liquid crystal display monitor, an organic light emitting diode display monitor, a plasma display monitor or a cathode ray tube display monitor. When the first buckling element 27 clamps and fixes the positioning pin 24, the display monitor is in a horizontal displaying state.

When the second buckling element 28 clamps and fixes the positioning pin 24, the display monitor is in a vertical displaying state.

According to the positioning mechanism and display device using the same disclosed in the first embodiment, the positioning pin is respectively buckled to the first buckling element and the second buckling element for positioning an object, such that the pad used in a pivotal positioning mechanism of a conventional display device is replaced and the mal-positioning of rotation due to the wearing between pads is avoided. Consequently, when the display monitor rotates the problems of inaccurate positioning and angle tilting are avoided, and the display monitor can be securely in the first positioning state and the second positioning state.

Second Embodiment

Figure 3:
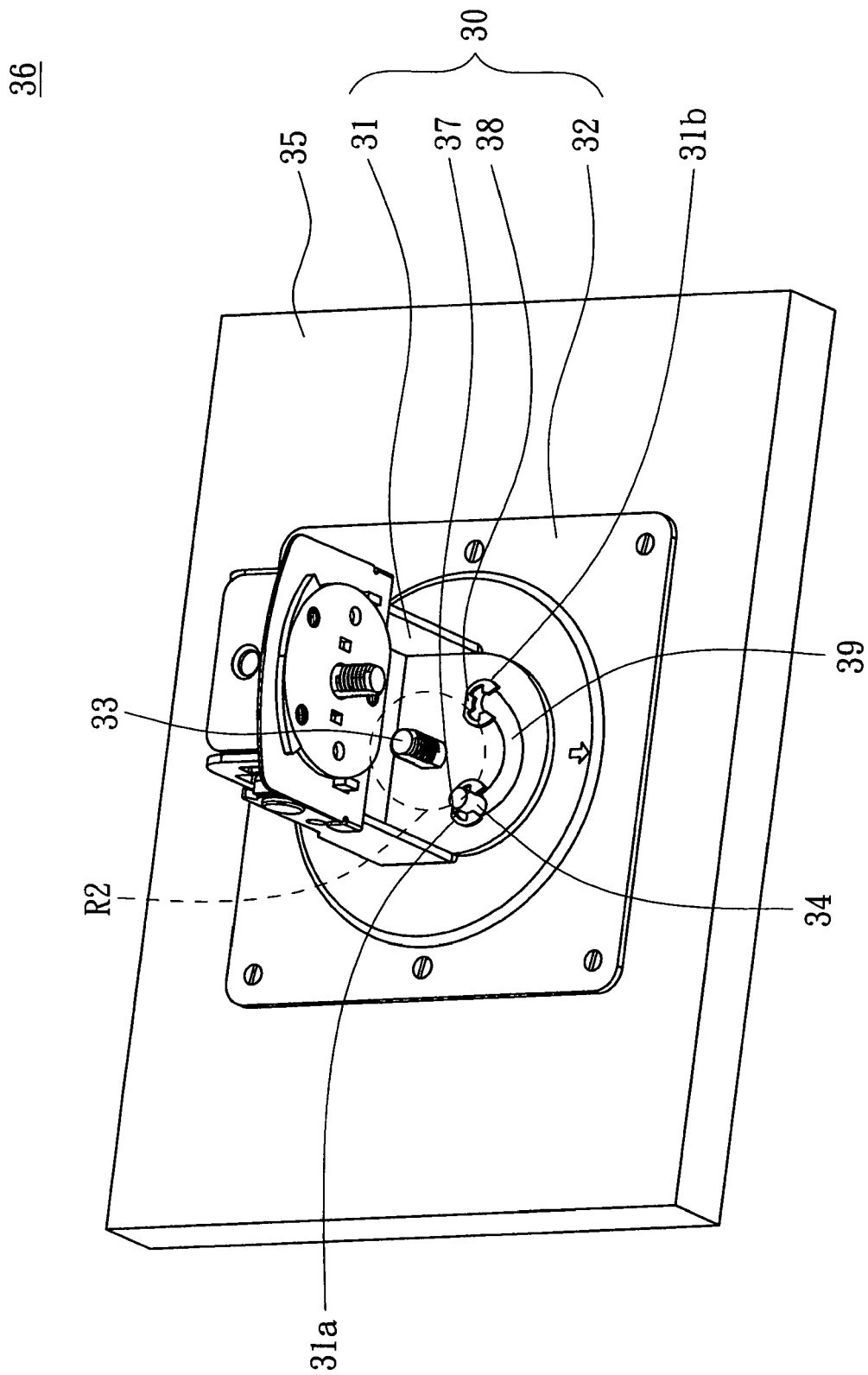
FIG. 3 is a perspective of a positioning mechanism according to a second embodiment of the invention.

Referring to FIG. 3, a perspective of a positioning mechanism according to a second embodiment of the invention is shown. The positioning mechanism 30 comprises a fixed frame 31, a first buckling element 37, a second buckling element 38 and a rotary component 32. The first buckling element 37 is disposed to a first position 31a of the fixed frame 31. The second buckling element 38 is disposed to a second position 31b of the fixed frame 31. The rotary component 32 is connected to an object 35 and is pivoted to the fixed frame 31, such that the object 35 and the rotary component 32 are synchronously rotated with respect to the fixed frame 31. The rotary component 32 has a positioning pin 34. Compared with the first embodiment, the fixed frame 31 of the present embodiment of the invention further has a limiting slot 39 for the positioning pin 34 to pass through, such that the positioning pin 34 is moved within the limiting slot 39. The first buckling element 37, the second buckling element 38, the limiting slot 39 and the positioning pin 34 are located on a circular locus R2, wherein circular locus R2 is centered around the rotary shaft 33. The first position 31a of the fixed frame 31 is one end of the limiting slot 39. The second position 31b of the fixed frame 31 is the other end of the limiting slot 39. The object is in a first positioning state and a second positioning state when the positioning pin 34 is buckled to the first buckling element 37 and the second buckling element 38. When the object 35 is a display monitor, the positioning mechanism 30 and the object 35 form a display device 39.

In the present embodiment of the invention the first buckling element 37 is an E-type ring or a C-type ring. The second buckling element 38 is an E-type ring or a C-type ring. Besides, the first buckling element 37, the second buckling element 38 and the fixed frame 31 can be preferably formed in one piece.

Third Embodiment

Figure 4:
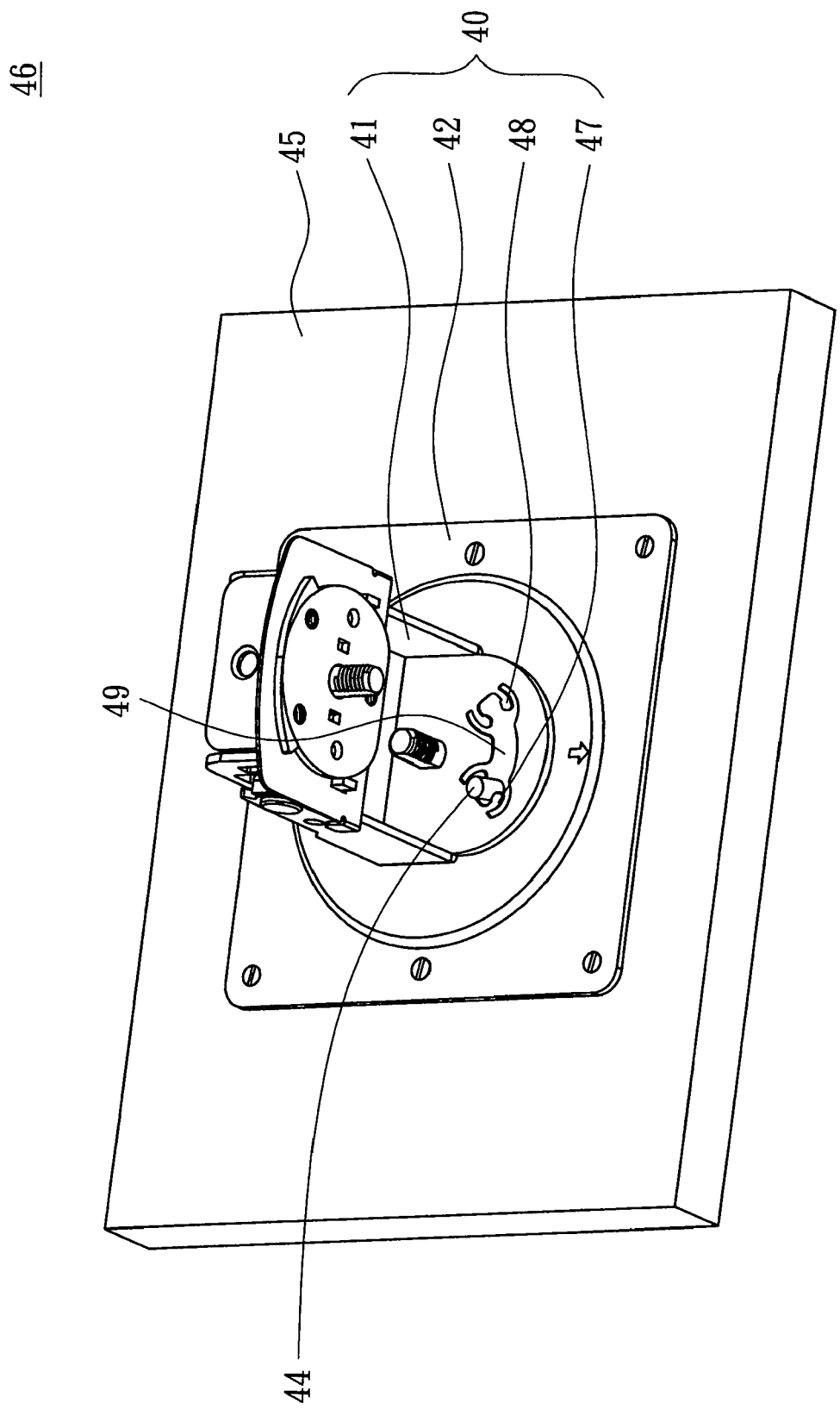
FIG. 4 is a perspective of a positioning mechanism according to a third embodiment of the invention.

Referring to FIG. 4, a perspective of a positioning mechanism according to a third embodiment of the invention is shown. The positioning mechanism 40 comprises a fixed frame 41, a first buckling element 47, a second buckling element 48 and a rotary component 42. The rotary component 42 is connected to an object 45 and is pivoted to the fixed frame 41, such that the object 45 and the rotary component 42 are synchronously rotated with respect to the fixed frame 41. The rotary component 42 has a positioning pin 44. The fixed frame 41 has a limiting slot 49 for the positioning pin 44 to pass through, such that the positioning pin 44 is moved within the limiting slot 49. Compared with the positioning mechanism of the second embodiment, the first buckling element 47 and the second buckling element 48 are respectively formed at the two ends of the limiting slot 49, that is, the first buckling element 47, the second buckling element 48 and the fixed frame 41 are preferably formed in one piece. The object is in a first positioning state and a second positioning state when the positioning pin 44 is buckled to the first buckling element 47 and the second buckling element 48 respectively. When the object 45 is a display monitor, the positioning mechanism 40 and the object 45 form a display device 49.

According to the positioning mechanism and the display device using the same disclosed in the above preferred embodiments of the invention, the positioning pin is respectively buckled to the first buckling element and the second buckling element for positioning an object, such that the pads used in a pivotal positioning mechanism of a conventional display device is replaced and the mal-positioning of rotation due to the wearing between pads is avoided. Consequently, the display monitor is fixed securely, and the problems of inaccurate positioning and angle tilting that occur when the display monitor rotates are avoided.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning mechanism, comprising: a fixed frame; a first buckling element fixed to a first position of the fixed frame; a second buckling element fixed to a second position of the fixed frame; and a rotary component with a positioning pin; wherein the rotary component is connected to an object and pivoted to the fixed frame, such that the object and the rotary component are synchronously rotated with respect to the fixed frame; wherein the first buckling element has a pair of first suspending arms and two opposite first flanges separating a first gap smaller than a diameter of the positioning pin, and the second buckling element has a pair of second suspending arms and two opposite second flanges separating a second gap smaller than the diameter of the positioning pin; and wherein the object is in a first positioning state when the positioning in is clamped by the first flanges, and in a second positioning state when the positioning pin is buckled to the second buckling element through the elasticity of the second suspending arms respectively.

2. The positioning mechanism according to claim 1, further comprises a rotary shaft for pivotally connecting the fixed frame and the rotary component, such that the rotary component is rotated with respect to the fixed frame.

3. The positioning mechanism according to claim 2, wherein the first buckling element, the second buckling element and the positioning pin are located on a circular locus that is centred around the rotary shaft.

4. The positioning mechanism according to claim 3, wherein the first buckling element is an E-type ring or a C-type ring.

5. The positioning mechanism according to claim 3, wherein the second buckling element is an E-type ring or a C-type ring.

6. The positioning mechanism according to claim 2, wherein the fixed frame has a limiting slot for the positioning pin to pass through, such that the positioning pin moves within the limiting slot.

7. The positioning mechanism according to claim 6, wherein the first buckling element, the second buckling element, the limiting slot and the positioning pin are located on a circular locus that is centred around the rotary shaft.

8. The positioning mechanism according to claim 7, wherein the first position is one end of the limiting slot, the second position is the other end of the limiting slot.

9. The positioning mechanism according to claim 8, wherein the first buckling element is an E-type ring or a C-type ring.

10. The positioning mechanism according to claim 8, wherein the second buckling element is an E-type ring or a C-type ring.

11. The positioning mechanism according to claim 1, wherein the fixed frame is further connected to a supporting base used for supporting the object on a plane.

12. The positioning mechanism according to claim 1, wherein the fixed frame is further connected to a linking element synchronously rotated with the fixed frame, the linking element is connected to a supporting base for supporting the object on a plane.

13. The positioning mechanism according to claim 1, wherein the object is a display monitor.

14. The positioning mechanism according to claim 13, wherein the display monitor is a liquid crystal display monitor, an organic light emitting diode display monitor, a plasma display monitor or a cathode ray tube display monitor.

15. The positioning mechanism according to claim 1, wherein the rotary component is buckled to, engaged to, screwed to or adhered to the object.

16. The positioning mechanism according to claim 1, wherein the fixed frame, the first buckling element and the second buckling element are integrally formed in one piece.

17. A display device, comprising: a display monitor; and a positioning mechanism, comprising: a fixed frame; a first buckling element fixed to a first position of the fixed frame; a second buckling element fixed to a second position of the fixed frame; and a rotary component with a positioning pin; wherein the rotary component is connected to an object and pivoted to the fixed frame, such that the object and the rotary component are synchronously rotated with respect to the fixed frame; wherein the first buckling element has a pair of first suspending arms and two opposite first flanges separating a first gap smaller than a diameter of the positioning pin, and the second buckling element has a pair of second suspending arms and two opposite second flanges separating a second gap smaller than the diameter of the positioning pin; and wherein the display monitor is in a first positioning state when the positioning in is clamped by the first flanges, and in a second positioning state when the positioning pin is buckled to the second buckling element through the elasticity of the second suspending arms respectively.

18. The display device according to claim 17, wherein the positioning mechanism further comprises a rotary shaft for pivotally connecting the fixed frame and the rotary component, such that the rotary component is rotated with respect to the fixed frame.

19. The display device according to claim 18, wherein the first buckling element, the second buckling element and the positioning pin are located on a circular locus that is centred around the rotary shaft.

20. The display device according to claim 19, wherein the first buckling element is an E-type ring or a C-type ring.

21. The display device according to claim 19, wherein the second buckling element is an E-type ring or a C-type ring.

22. The display device according to claim 18, wherein the fixed frame has a limiting slot for the positioning pin to pass through, such that the positioning pin moves within the limiting slot.

23. The display device according to claim 22, wherein the first buckling element, the second buckling element, the limiting slot and the positioning pin are located on a circular locus that is centred around the rotary shaft.

24. The display device according to claim 23, wherein the first position is one end of the limiting slot, and the second position is the other end of the limiting slot.

25. The display device according to claim 24, wherein the first buckling element is an E-type ring or a C-type ring.

26. The display device according to claim 24, wherein the second buckling element is an E-type ring or a C-type ring.

27. The display device according to claim 17, wherein the fixed frame is further connected to a supporting base used for supporting the display monitor on a plane.

28. The display device according to claim 17, wherein the fixed frame is further connected to a linking element synchronously rotated with the fixed frame, and the linking element is connected to a supporting base for supporting the display monitor on a plane.

29. The display device according to claim 17, wherein the display monitor is a liquid crystal display monitor, an organic light emitting diode display monitor, a plasma display monitor or a cathode ray tube display monitor.

30. The display device according to claim 17, wherein the rotary component is buckled to, engaged to, screwed to or adhered to the display monitor.

31. The display device according to claim 17, wherein the fixed frame, the first buckling element and the second buckling element are integrally formed in one piece.

* * * * *